United States Patent [19]

Key

[11] Patent Number: 5,514,920
[45] Date of Patent: May 7, 1996

[54] FUEL DISPENSER LEAK DETECTOR

[76] Inventor: William D. Key, 8209 Hursh Rd., Leo, Ind. 46765

[21] Appl. No.: 174,310

[22] Filed: Dec. 30, 1993

[51] Int. Cl.$^6$ ..................................................... G01M 3/32
[52] U.S. Cl. ............................................. 307/118; 361/178
[58] Field of Search .................................. 361/118, 178; 340/244, 59, 605, 623; 73/49.2, 313, 308; 222/61; 250/527; 307/118

[56] References Cited

U.S. PATENT DOCUMENTS

| | | | |
|---|---|---|---|
| 3,818,470 | 6/1974 | Hirsbrunner | 340/244 |
| 4,505,148 | 3/1985 | Zajac | 340/605 |

*Primary Examiner*—Todd Deboer
*Assistant Examiner*—S. Jackson
*Attorney, Agent, or Firm*—Roger M. Rickert

[57] ABSTRACT

A leak detector and circuit interrupter for detecting the presence of a liquid in the base of a dispenser containment box and interrupting the supply of electrical power when such liquid is detected is disclosed. There is a user enableable circuit for selectively enabling the pump and an override circuit which is operable when enabled to disable the user enableable circuit. An optical liquid sensing probe is positioned near the bottom of the containment box with optical coupling to the override circuit. The optical probe is coupled to a light emitting diode, a photosensitive transistor, and includes a light path with at least one total internal reflection surface normally coupling the light emitting diode and the photosensitive transistor. The probe normally maintains the override circuit in an ineffective state, but, when the light path is interrupted by an accumulation of liquid in the bottom of the containment box, changes state thereby enabling the override circuit and disabling the pump. The override circuit remains in its enabled condition once it is enabled regardless of the state of the optical liquid sensing probe. A modified circuit and series connected optical switches provide a safety power disconnect in the event of attempted entry into a dispenser without first disabling the power supply.

12 Claims, 2 Drawing Sheets

5,514,920

FUEL DISPENSER LEAK DETECTOR

SUMMARY OF THE INVENTION

The present invention relates generally to circuit breakers and more especially to a fiber optic liquid level detection scheme for actuating a circuit breaker or interrupter when a liquid level is abnormal.

While the present invention has applicability to many liquid pumping or dispensing tasks, the illustrative environment of the present invention is in gasoline service stations at a conventional fuel dispenser or so-called "pump." One or more grades of fuel are typically dispensed via individual dispensing hoses, fuel pumps, metering devices and often other equipment located in each dispenser unit. There is typically a metal enclosure with a bottom containment box or sump. A dispenser pan for catching leaking fuel may also be present. Should a fuel leak occur within the dispenser, fuel will accumulate in this lower containment box portion of the dispenser or in the dispenser pan. An electrical spark within the containment box could then have disastrous results.

Thus, more specifically, the present invention provides a fiber optic leak detector for automatically shutting off a fuel dispenser in the event of a fuel leak which might otherwise go undetected. The leak detector and associated circuit interrupter is self contained requiring no external wiring, and will detect leaks in single, twin or multi-product dispensers.

The leak detector might also be disposed in an above ground storage tank with the optical sensor in a monitoring pipe within the secondary containment structure. A transfer pump would be shut off should a leak be detected. Leak detection in other than fuel applications will be readily apparent.

The concepts of the circuit interrupter may also be applied to temporarily interrupt the electrical supply to fuel dispensers or similar devices whenever an access door to such a device is opened. Optical switches associated with the doors as opposed to electrical contact switches greatly reduces the likelihood of an electrical spark and potential accident.

Among the several objects of the present invention may be noted the provision of a fuel level actuated circuit breaker for a fuel dispenser; the provision of a liquid sensor for detecting the accumulation of fuel in the lower portion of a fuel dispenser; and the provision of a liquid sensor for detecting the accumulation of fuel without any electrical leads in the vicinity of such fuel. These as well as other objects and advantageous features of the present invention will be in part apparent and in part pointed out hereinafter.

In general, a liquid level actuated circuit interrupter has a latching circuit and an optical liquid level sensing probe. The latching circuit normally operates in an unlatched condition to provide power from a source to a load. It is switchable to a latched condition to interrupt the supply of power from the source to the load upon command from the optical liquid sensing probe. The probe includes an optical coupling to the latching circuit and is effective in a first state to maintain the latching circuit in its unlatched condition. The probe changes to a second state upon detecting an accumulation of liquid to switch the latching circuit to its latched condition thereby disabling the load. Once switched, the latching circuit remains in the latched condition regardless of the state of the optical liquid sensing probe thereafter. The latching circuit may be delatched and power restored to the device only by active operator intervention to first remove whatever liquid is contacting the fiber optic probe, then disconnect the latching circuit from the source, and finally reestablish the supply of power to the load. In one form, the optical probe includes a light emitting diode, a photosensitive transistor, and a light path normally coupling the light emitting diode and the photosensitive transistor. The light path includes at least one total internal reflection surface which is rendered light conductive by the presence of a liquid at the surface. This interrupts the light path thereby changing the probe to its second state.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
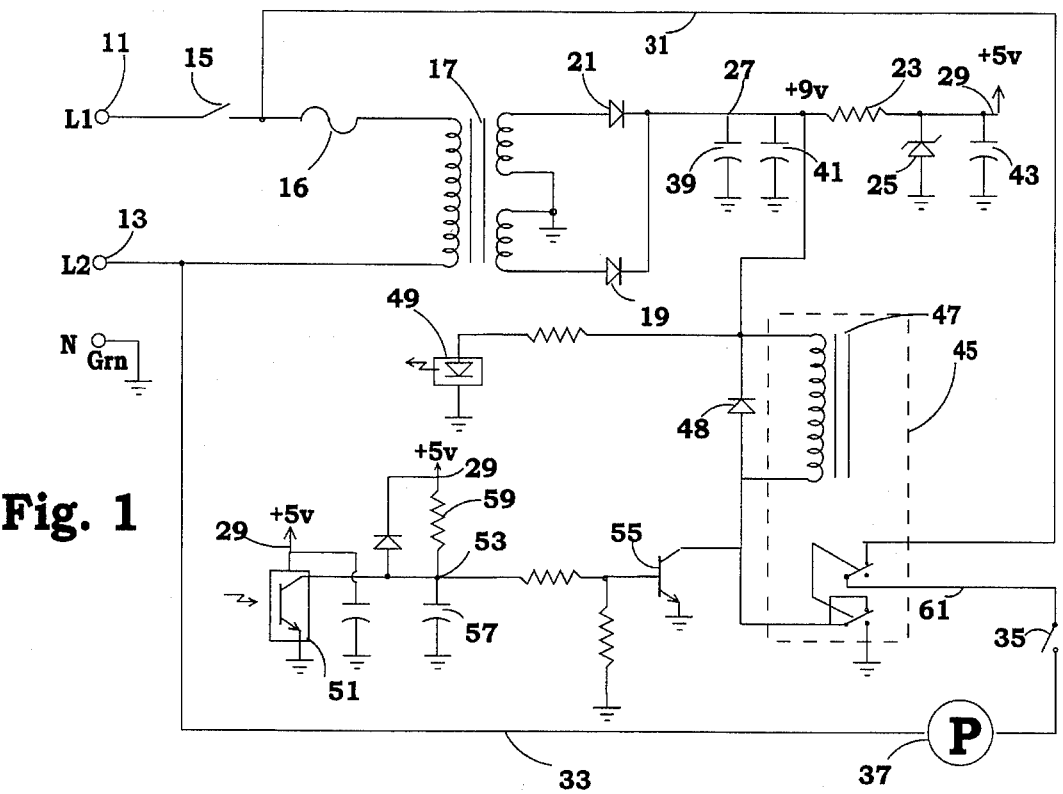
FIG. 1 is a schematic diagram of a liquid level actuated circuit interrupter incorporating the invention in one form.

In FIG. 1, line voltage is applied to the terminals 11 and 13 and through the normally closed switch 15 and line fuse 16 to the primary of transformer 17. The transformer has a center tapped secondary winding which, with diodes 19 and 21 provides a full wave rectified voltage of about nine volts at 27. The capacitors 39, 41 and 43 smooth the full wave rectified voltage and provide an essentially ripple-free direct current supply. Resistor 23 and zener diode 25 provide a smooth five volt direct current supply at 29 which is supplied to two like numbered locations in the lower portion of the circuit. When normally open switch 35 is closed to commence dispensing fuel, line voltage is supplied by way of lines 31 and 33, and switch 35 to an electrically driven fuel pump 37. Current flow to the pump 37 is through the normally closed upper contacts of the double-pole double-throw relay 45. With the relay coil 47 de-energized, the contacts are in the position illustrated in FIG. 1. Thus, during normal operation the pump is energized and de-energized by user controlled switch 35.

The regulated nine volts from the power Supply normally enables a light source such as an emitting diode 49 which, as will be explained subsequently, normally maintains a light responsive device such as phototransistor 51 in a conducting state. Conduction by phototransistor 51 maintains point 53 at ground potential thus denying transistor 55 any base drive and maintaining that transistor 55 nonconducting. Under these circumstances, relay coil 47 has no current flow. When the light path from the light emitting diode 49 to the phototransistor 51 is interrupted, capacitor 57 begins to charge from current flow through resistor 59. The voltage across capacitor 57 is supplied by way of a resistive voltage divider circuit to the base of transistor 55. Thus, when the light path from 49 to 51 experiences more than a momentary interruption, transistor 55 is enabled and nine volt current flows from point 27 through coil 47 to ground. The time constant of series resistor 59, capacitor 57 circuit is selected to be long enough that momentary interruptions in the light path are ineffective to enable transistor 55 and relay 45. When relay 45 is enabled, line 61 is connected to ground and no voltage can be applied to pump 37. Moreover, the lower relay contact now connects the relay coil 47 directly between point 27 and ground, effectively latching the relay in a pump disabling condition despite any re-establishment of the light path or turn-off of transistor 55. The relay is disabled and the circuit reset by opening normally closed switch 15. Opening and then reclosing the normal pump enabling on/off switch 35 is ineffective to unlatch the relay 47. When the relay is disabled, a surge suppressing diode 48 conducts as the magnetic field of coil 47 collapses. The switch may be omitted and a conventional circuit breaker turned off and then back on if desired, or other some other form of active operator intervention to first disconnect the latching circuit from the source and then reestablish the supply of power to the device may be employed. A very brief or momentary interruption of the supply voltage may be ineffective to reset the circuit interrupter. If there is still sufficient base drive to transistor 55 from the residual charge on capacitor 57 when power is re-established, the momentary interruption will be ineffective to render transistor 55 nonconducting. Current will again flow through the transistor 55 and relay coil 47 interrupting the supply of power to the pump.

Figure 2:
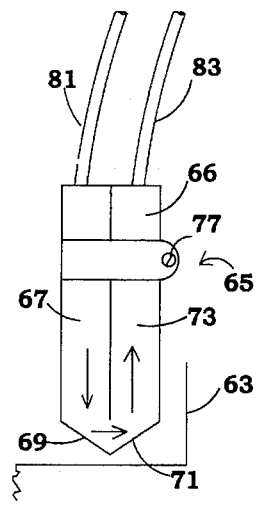
FIG. 2 is a simplified elevation view of the lower portion of a fuel dispenser containing an optical liquid level sensing probe.
Figure 3:
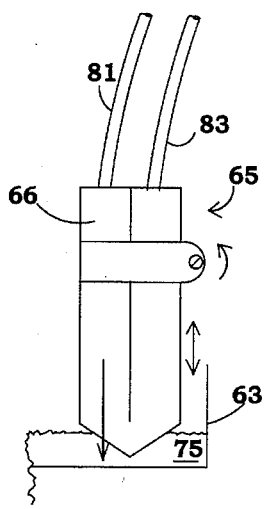
FIG. 3 is a view similar to FIG. 2, but showing the changes which occur when a liquid accumulates in the base of the dispenser.

The optical probe 65 is shown in FIGS. 2 and 3 located in the bottom of the containment box 63. The probe 65 includes fiber optic connectors 85 and 87 for connecting to the light emitting diode 49 and the photosensitive transistor 51 of FIG. 1. Fiber optic transmission paths 81 and 83 connect the sensor portion 66 of the probe to the light emitting diode 49 and phototransistor 51 respectively. There is an optical path as indicated by the arrows in FIG. 2 through a material 67 such as plastic or glass from the diode 49 to an angled surface 69. Since the material 67 is more dense than air, total internal reflection occurs at surface 69. Similarly, surface 71 reflects the light back upwardly in material portion 73 to the transistor 51. The material portions 67 and 73 may be separate fiber optics each coupled to a prism defining the surfaces 69 and 71. Thus, a light path normally coupling the light emitting diode 49 and the photosensitive transistor 51 is established. In FIG. 2, the light path is interrupted by the accumulation of a liquid 75. This liquid is more dense than air and the total internal reflection at surfaces 69 and 71 no longer occurs. Refraction as well as reflection now occurs at these surfaces rendering the surfaces light conductive. The level of liquid necessary to trigger the circuit interrupter can be adjusted by loosening the screw 77 as indicated by an arrow in FIG. 3, sliding the probe up or down and re-securing the screw 77.

Figure 4:
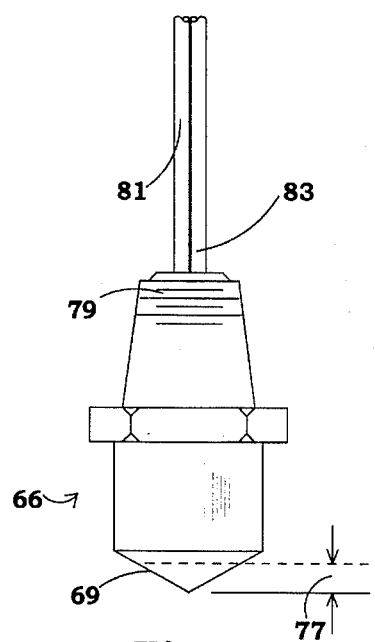
FIG. 4 is a view of one preferred form for the sensor portion of the probe of FIGS. 2 and 3.

A preferred form for the probe is shown in FIG. 4 where the space 77 represents the actuation level (⅛ inch for that particular probe). The probe has a threaded base 79 which screws into a sensor housing (not shown), and the optical fiber cables 81 and 83 extend to the light emitting diode 49 and phototransistor 51 respectively as in FIGS. 2 and 3.

The method of operation of the system of FIGS. 1–4 should now be clear. The controller or circuit breaker is alerted from a fiber optic sensor which is located in a sump or containment box in base of the dispenser. If liquid enters the sump, the light path of FIG. 2 is interrupted and relay 45 is actuated to shut off the dispenser. This shut-off calls for an investigation by the station operator to check for the source of the liquid. When all is safe and the liquid removed, the circuit breaker is reset by opening and then reclosing the conventional power supply circuit breaker, or other power source switch. This momentary interruption resets the controller and the circuit is again armed and monitoring.

Figure 5:
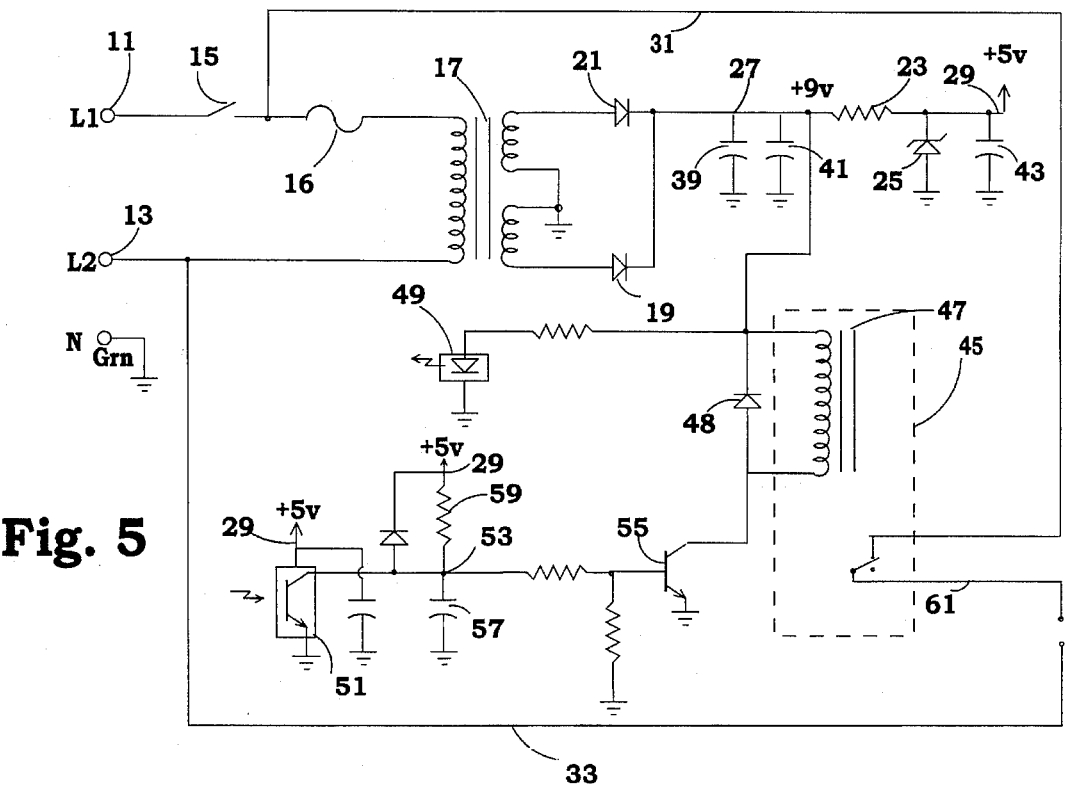
FIG. 5 is a schematic diagram similar to FIG. 1, but illustrating a non-latching version of the invention.

FIG. 5 differs from FIG. 1 primarily in the deletion of the latching capability of relay 45, and the omission of switch 15. The circuit may have lines 61 and 33 connected one or more pumps, or those lines may supply power to both dispensing pumps and solenoid valves in the product, e.g., fuel lines. So long as the light path from diode 49 to transistor 51 is maintained, the dispensers will be operative and the solenoid valves open. When that light path is interrupted, the relay 45 is enabled, power to the pumps interrupted and the solenoid valves closed. Upon restoration of the light path, the solenoids open and the dispensers are again enabled.

Figure 6:
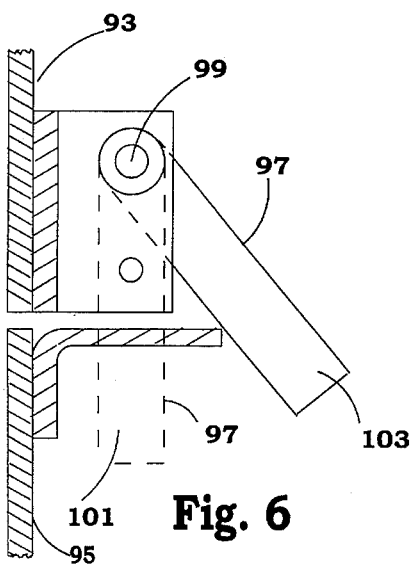
FIG. 6 is a plan view of a portion of a dispenser and door incorporating an optical switch for use in the system of FIG. 5.
Figure 7:
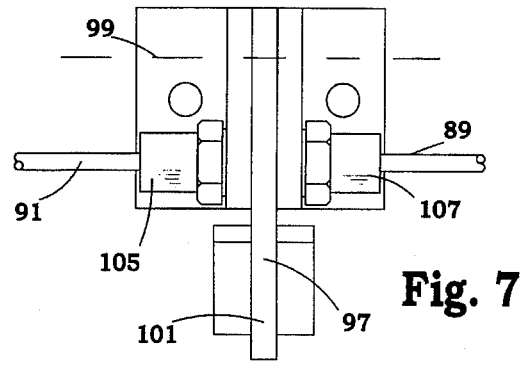
FIG. 7 is a side view of the optical switch of FIG. 6.

One application of the circuit of FIG. 5 is to the doors of a fuel dispenser. Maintenance personnel should disable the power supply to such a dispenser prior to entering the cabinet, however, frequently that step is bypassed. A pair of series connected optical switches such as illustrated in FIGS. 6 and 7 with one switch associated with each door will ensure that the step is not bypassed. The dispenser cabinet has a fixed frame portion 93 and a door 95. An arm 97 pivots at 99 between the door open position 101 and the door closed position 103. A fiber optic cable 89 extends to the light source 49. Another fiber optic cable 91 extends to a second optical switch of the same design associated with a second door. A third optical cable extends from the second switch back to the light sensor 51. In the door open position, this arm intercepts the light passing between the fiber optic connectors 105 and 107 interrupting the light path, energizing relay 45 and disabling the supply of power to the dispenser. If either of the switches opens the light path, transistor 51 ceases conducting and transistor 55 is enabled thereby energizing relay 45 and disabling the supply of power to the dispenser.

Thus, in FIG. 5, lines 33 and 61 supply power from the electrical source 11, 13 to an electrically powered device such as a fuel dispenser. A power interrupting circuit includes the light source 49 and light responsive device 51 which are normally coupled by the fiber optic pathway so that the light source is illuminating the light responsive device to provide power from the electrical source to the electrically powered device. The circuit switches to a second condition when the light source 49 is not illuminating the light responsive device 51 enabling relay 45 so as to interrupt the supply of power from the electrical source to the electrically powered device. The fiber optic pathway is a circuitous optical pathway including at least one optical switch operable in a first (door closed) state to transmit light along the pathway and in a second (door open or similar unsafe condition) state to prevent the transmission of light along the pathway.

From the foregoing, it is now apparent that a novel optical circuit breaker arrangement has been disclosed meeting the objects and advantageous features as set out hereinbefore as well as others. Numerous modifications will now suggest themselves to those of ordinary skill in this art. For Example, an audible alarm may be readily incorporated as may individual visual alarms for individual dispensers. The reset may be by a common switch, a common circuit breaker, or individual reset buttons for individual dispensers may be employed. While the invention has been described in the environment of a fuel dispenser, it is equally applicable to chemical plants, farm or agricultural fertilizer applications, transfer stations and a variety of other liquid pumping or dispensing areas. These as well as other modifications as to the precise shapes, configurations and details may be made by those having ordinary skill in the art without departing from the spirit of the invention or the scope thereof as set out by the claims which follow.

What is claimed is:

1. In a liquid dispenser having a pump and a dispenser containment box, a leak detector for detecting the presence of a liquid in the base of the dispenser containment box comprising:

a user enableable circuit for selectively enabling the pump;

an override circuit operable when enabled to disable the user enableable circuit;

an optical liquid sensing probe positioned near the bottom of the containment box including optical coupling to the override circuit, the probe operable normally in a first state to maintain the override circuit ineffective, and changing to a second state upon detecting an accumulation of liquid in the bottom of the containment box to enable the override circuit thereby disabling the pump.

2. The leak detector of claim 1 wherein the override circuit includes latching means for maintaining the override circuit in its enabled condition once it is enabled regardless of the state of the optical liquid sensing probe.

3. The leak detector of claim 1 wherein the override circuit includes a light source and a light responsive device, and the optical probe includes a light path normally coupling the light source and the light responsive device, the light path being interrupted, thereby changing the probe to its second state, by an accumulation of liquid in the bottom of the containment box.

4. The leak detector of claim 3 wherein the light path includes at least one total internal reflection surface which is rendered light conductive by the presence of a liquid at the surface.

5. The leak detector of claim 3 wherein the light source comprises a light emitting diode and the light responsive device comprises a photosensitive transistor.

6. In an electrical circuit for supplying power from a source to an electrically powered device, a liquid level actuated circuit interrupter comprising:

a latching circuit normally operable in an unlatched condition to provide power from the source to the device and switchable to a latched condition to interrupt the supply of power from the source to the device; and an optical liquid sensing probe including optical coupling to the latching circuit, the probe being effective in a first state to maintain the latching circuit in its unlatched condition, and changing to a second state upon detecting an accumulation of liquid to switch the latching circuit to its latched condition thereby disabling the device, wherein the latching circuit remains in the latched condition once it is switched thereto regardless of the state of the optical liquid sensing probe thereafter and the latching circuit delatched and power restored to the device only by active operator intervention to disconnect the latching circuit from the source and then reestablish the supply of power to the device, the active operator intervention including clearing any accumulation of liquid from the optical liquid sensing probe prior to disconnecting the latching circuit from the source.

7. The circuit interrupter of claim 6 wherein the latching circuit includes a light source and a light responsive device, and the optical probe includes a light path normally coupling the light source and the light responsive device, the light path being interrupted by an accumulation of liquid in the bottom of the containment box, thereby changing the probe to its second state.

8. The circuit interrupter of claim 7 wherein the light source comprises a light emitting diode and the light responsive device comprises a photosensitive transistor.

9. The circuit interrupter of claim 7 wherein the light path includes at least one total internal reflection surface which is rendered light conductive by the presence of a liquid at the surface.

10. In an electrical circuit for supplying power from a electrical source to an electrically powered device, a circuit interrupter comprising:

a circuit including a light source and a light responsive device normally operable with the light source illuminating the light responsive device to provide power from the electrical source to the electrically powered device and switchable to a second condition when the light source is not illuminating the light responsive device to interrupt the supply of power from the electrical source to the electrically powered device;

a circuitous optical pathway coupling the light source to the light sensitive device, the pathway including an optical switch operable in a first state to transmit light along the pathway and in a second state to prevent the transmission of light along the pathway, the switch changing to the second state upon the occurrence of an unsafe condition to switch the circuit to its second condition thereby disabling the electrically powered device; and a second optical switch also operable in a first state to transmit light along the pathway and in a second state to prevent the transmission of light along the pathway, the second switch changing to the second state upon the occurrence of a further unsafe condition to switch the circuit to its second condition thereby disabling the electrically powered device.

11. The circuit interrupter of claim 10 wherein the optical switch and second optical switch are connected in series so that light transmission along the optical pathway is interrupted and the circuit is switched to its second condition upon the occurrence of either the unsafe condition or the further unsafe condition.

12. In an electrical circuit for supplying power from a electrical source to an electrically powered device, a circuit interrupter comprising:

a circuit including a light source and a light responsive device normally operable with the light source illuminating the light responsive device to provide power from the electrical source to the electrically powered device and switchable to a second condition when the light source is not illuminating the light responsive device to interrupt the supply of power from the electrical source to the electrically powered device; and a circuitous optical pathway coupling the light source to the light sensitive device, the pathway including an optical switch operable in a first state to transmit light along the pathway and in a second state to prevent the transmission of light along the pathway, the switch changing to the second state upon the occurrence of an unsafe condition to switch the circuit to its second condition thereby disabling the electrically powered device, the electrically powered device comprising a liquid dispenser having a pump and a dispenser containment box with at least one access door, said switch associated with an access door and operable in the first state only so long as the door remains closed, the switch changing to the second state upon the door being opened to disable the liquid dispenser.

* * * * *